(12) United States Patent
Yared et al.

(10) Patent No.: US 11,316,860 B2
(45) Date of Patent: Apr. 26, 2022

(54) CONSOLIDATED IDENTITY

(71) Applicant: Citrix Systems, Inc., Ft. Lauderdale, FL (US)

(72) Inventors: Peter Yared, San Francisco, CA (US); Tomas Kmec, Prague (CZ); Jan Surovec, Prague (CZ); Michal Gajdos, Prague (CZ); Omar ElNaggar, San Francisco, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 419 days.

(21) Appl. No.: 16/221,376

(22) Filed: Dec. 14, 2018

(65) Prior Publication Data

US 2019/0199729 A1    Jun. 27, 2019

Related U.S. Application Data

(60) Provisional application No. 62/608,581, filed on Dec. 21, 2017.

(51) Int. Cl.
*H04L 29/06* (2006.01)

(52) U.S. Cl.
CPC ........ *H04L 63/102* (2013.01); *H04L 63/0815* (2013.01); *H04L 63/101* (2013.01); *H04L 63/104* (2013.01); *H04L 63/105* (2013.01)

(58) Field of Classification Search
CPC . H04L 63/102; H04L 63/0815; H04L 63/104; H04L 63/105
USPC .......................................................... 726/4
See application file for complete search history.

(56) References Cited

U.S. PATENT DOCUMENTS

| | | | |
|---|---|---|---|
| 8,656,508 B2 * | 2/2014 | King | G06F 21/105 726/28 |
| 9,774,586 B1 | 9/2017 | Roche et al. | |
| 9,942,321 B2 * | 4/2018 | Versteeg | H04L 67/16 |
| 10,484,243 B2 * | 11/2019 | Cole | H04L 41/0806 |
| 2003/0105974 A1 | 6/2003 | Griffin et al. | |
| 2006/0236096 A1 * | 10/2006 | Pelton | H04L 9/083 713/155 |
| 2006/0265688 A1 * | 11/2006 | Carlson | G06F 8/36 717/101 |

(Continued)

FOREIGN PATENT DOCUMENTS

WO    WO-03/049000 A1    6/2003
WO    WO-2016/138067 A1    9/2016

OTHER PUBLICATIONS

International Search Report and Written Opinion for Int. Appl. No. PCT/US2018/065855, dat Mar. 5, 2019.

(Continued)

*Primary Examiner* — Eric W Shepperd
*Assistant Examiner* — Peiliang Pan
(74) *Attorney, Agent, or Firm* — Foley & Lardner LLP

(57) ABSTRACT

According to various embodiments, a consolidated identity system and method are implemented to provide improved identity management and resource access management, particularly in the context of an enterprise system that requires a tight trust model. In at least one embodiment, the described system and method provide mechanisms for mapping identities among resources. The system and method are able to extract information relevant to a particular entity, such as an employee or user, and to consolidate and/or personalize such information as needed.

29 Claims, 14 Drawing Sheets

(56) References Cited

U.S. PATENT DOCUMENTS

| | | | |
|---|---|---|---|
| 2007/0233600 A1* | 10/2007 | McMahon | G06Q 10/06 |
| | | | 705/51 |
| 2008/0162494 A1* | 7/2008 | Long | G06F 16/256 |
| 2008/0184349 A1 | 7/2008 | Ting | |
| 2009/0063490 A1* | 3/2009 | Fuerst | G06F 16/24 |
| 2009/0133110 A1 | 5/2009 | Kumar et al. | |
| 2013/0081039 A1 | 3/2013 | Glew et al. | |
| 2013/0103640 A1* | 4/2013 | Rehman | G06F 16/256 |
| | | | 707/609 |
| 2013/0133048 A1* | 5/2013 | Wyn-Harris | H04L 63/08 |
| | | | 726/5 |
| 2013/0166485 A1* | 6/2013 | Hoffmann | G06N 20/00 |
| | | | 706/20 |
| 2014/0007182 A1 | 1/2014 | Qureshi et al. | |
| 2014/0137262 A1 | 5/2014 | Stofberg et al. | |
| 2015/0163206 A1* | 6/2015 | McCarthy | G06F 21/10 |
| | | | 713/171 |
| 2015/0358331 A1* | 12/2015 | Rachalwar | H04L 63/102 |
| | | | 726/7 |
| 2017/0323350 A1* | 11/2017 | Laderer | G06Q 10/063114 |
| 2018/0027006 A1* | 1/2018 | Zimmermann | G06F 9/46 |
| | | | 726/11 |
| 2018/0322183 A1 | 11/2018 | Feijoo | |
| 2019/0026803 A1* | 1/2019 | De Guzman | G06Q 30/0641 |
| 2019/0129616 A1* | 5/2019 | Nguyen | G06F 3/0605 |

OTHER PUBLICATIONS

Australian Examination Report on AU Appl. No. 2018388459 dated Mar. 9, 2021.
International Preliminary Report on Patentability on PCT Appl. No. PCT/US2018/065855 dated Jul. 7, 2020.
Examiner's Report on CA Appl. No. 3086176 dated Aug. 4, 2021.
Extended EP Search Report on EP Appl. No. 18890686.1 dated Aug. 16, 2021.

* cited by examiner

CONSOLIDATED IDENTITY

CROSS-REFERENCE TO RELATED APPLICATION

The present application claims the benefit of U.S. Provisional Application Ser. No. 62/608,581 for "Consolidated Identity", filed Dec. 21, 2017, which is incorporated by reference herein in its entirety.

TECHNICAL FIELD

The present document relates to techniques for managing authentication and identity in online environments.

BACKGROUND

Identity management is a key aspect of many organizations, providing important information as to which users are authorized to access and use which resources, either within a single organization or across multiple organizations. Often, many different resources within an organization are managed using multiple identity management systems, each having different access protocols and maintaining separate sets of user records. Each such identity management system typically relies on an identity provider that maintains a database of user records that store credentials indicating which users can access which resources. Upon a user's attempt to access a resource, the resource provider can consult an identity provider to verify that the user is authorized to access the resource. If the user is so authorized, the resource grants access to the user. However, when multiple identity management systems are in use for a number of different resources, the task of determining whether to grant access is significantly more complex, especially when the same user may have different electronic identities across different systems.

Federated identity is a known technique for linking a person's electronic identity and/or attributes across multiple identity management systems. It allows separate parties to establish a loosely coupled trust relationship, such that an identity provider can vouch, to a separate service provider, that a person has logged into the identity provider's system. For example, a user can log into an airline website, and subsequently rent a car from a car rental website without having to manually log in again; rather, the previous login from the airline website is used to automatically identify the user and provide access to his or her identity-associated information at the car rental website. As another example, a user can log into an identity provider such as AOL, and then access another website, such as a weather website; the AOL login is automatically used to identify the user on the weather website, and to provide access to his or her identity-associated information at the weather website.

In general, federated identity operates in contexts where there is a loose trust model between the identity provider and the service provider. Federated identity systems usually include mechanisms for controlling what identity information should be shared between the identity provider and the service provider. A unique identifier for the identity is shared in order to bind the different accounts with the identity provider and service provider.

The Liberty Alliance Project has developed guidelines and best practices for identity management, including federated identity. It developed a specification that evolved into Security Assertion Markup Language (SAML), which provides a distinct separation of identity information between an identity provider and service provider, and includes the option of opaque tokens so that a service provider is not given access to any identifiable information about an identity.

Referring now to FIG. 1, there is shown a block diagram depicting a conceptual model for identity management including federated identity, according to the prior art. User 101 logs in 105 with identity provider 402 (such as AOL). Subsequently, user 101 wants to rent a car from service provider 102 (such as Hertz). An identity binding 106 allows identity provider 402 to provide information to servicer provider 102 that allows service provider 102 to automatically recognize user 101. Once service provider 102 recognizes user 101, service provider 102 can access information specific to user 101, such as rental history 104, that is stored at resources controlled by service provider 102. Notably, however, servicer provider 102 is not given access to information stored at resources controlled by identity provider 402, such as AOL account history and information 103. In this manner, a separation is maintained between identity provider 402 and servicer provider 102, even though they share enough information to allow users 101 to be identified at both based on authentication at identity provider 402.

This type of federated identity is well-known; for example, Google and Facebook logins are available on numerous websites, allowing users to be authenticated at other websites based on their Google or Facebook logins. Due to the pervasiveness of standards such as SAML, federated identity has also gained widespread adoption within enterprise environments such that users can use single sign-on for a variety of both on-premises (e.g., hosted in a customer-owned data center) and cloud systems (e.g., hosted remotely in a third-party data center).

However, federated identity may not be suitable for enterprise systems that require a tight trust model. Many enterprise environments require very tight trust relationships between an identity provider 402 and a service provider 102. In such a context, many service providers 102 are hosted by the enterprise itself, and those service providers 102 that are external to the enterprise are subject to intense security controls and compliance to ensure that employee data remains secure.

A direct consequence of federated identity is that all of the data related to an identity is spread across a large number of systems. Employee data, for example, is hosted in numerous systems including payroll, human resources management, financial, and ticketing systems. Thus, federated identity merely provides a limited solution wherein access is provided to various sources of relatively static data.

In the late 1990s and early 2000s, there was a push to deliver enterprise portals to user populations that would provide windows or "portlets" into each of the systems that they needed to access. In such an arrangement, each portlet calls a source system and retrieves information relevant to that employee. However, it can be excessively complex to set up the integration for each system. In addition, this arrangement can lead to performance issues, as each portlet can be very slow to load, and it can be difficult for employees to sort through all of the information across all of the portlets.

Currently, therefore, identity management within enterprise environments is inefficient and cumbersome. Although existing solutions provide mechanisms for single-sign-on to multiple resources, access to full data still requires individually accessing each resource that contains relevant data.

SUMMARY

According to various embodiments, a system and method are described for implementing an improved mechanism entitled consolidated identity. Consolidated identity addresses the above-described issues, particularly in the context of an enterprise system that requires a tight trust model. For example, within such a context, the enterprise itself may be the primary identity provider, and the service providers that provide services such as payroll and time-off requests do not hold any data that should not be privy to the enterprise. As such, there is no need for distinct identity separation between the identity provider and the service provider.

In at least one embodiment, the described system and method provide mechanisms for mapping identities among resources. The system and method are able to extract information relevant to a particular entity, such as an employee or user, and to consolidate and/or personalize such information as needed.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

According to various embodiments, the system can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the system described herein are designated as client devices, which are generally operated by end users. Other devices are designated as servers, which generally conduct back-end operations and communicate with client devices (and/or with other servers) via a communications network such as the Internet.

However, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

As described above, consolidated identity provides an improved mechanism that is suited for operation across a high-trust network. At an enterprise, the enterprise itself is the primary identity provider, and the service providers that provide services such as payroll and time-off requests do not hold any data that should not be privy to the enterprise. There is no need for distinct identity separation between the identity provider and the service provider.

In at least one embodiment, due to the sensitive nature of employee data and the need for self-service access to data, consolidated identity provides additional functionality to satisfy numerous requirements beyond a single customer master scheme wherein all of the information about a customer is consolidated into a single database.

Figure 3:
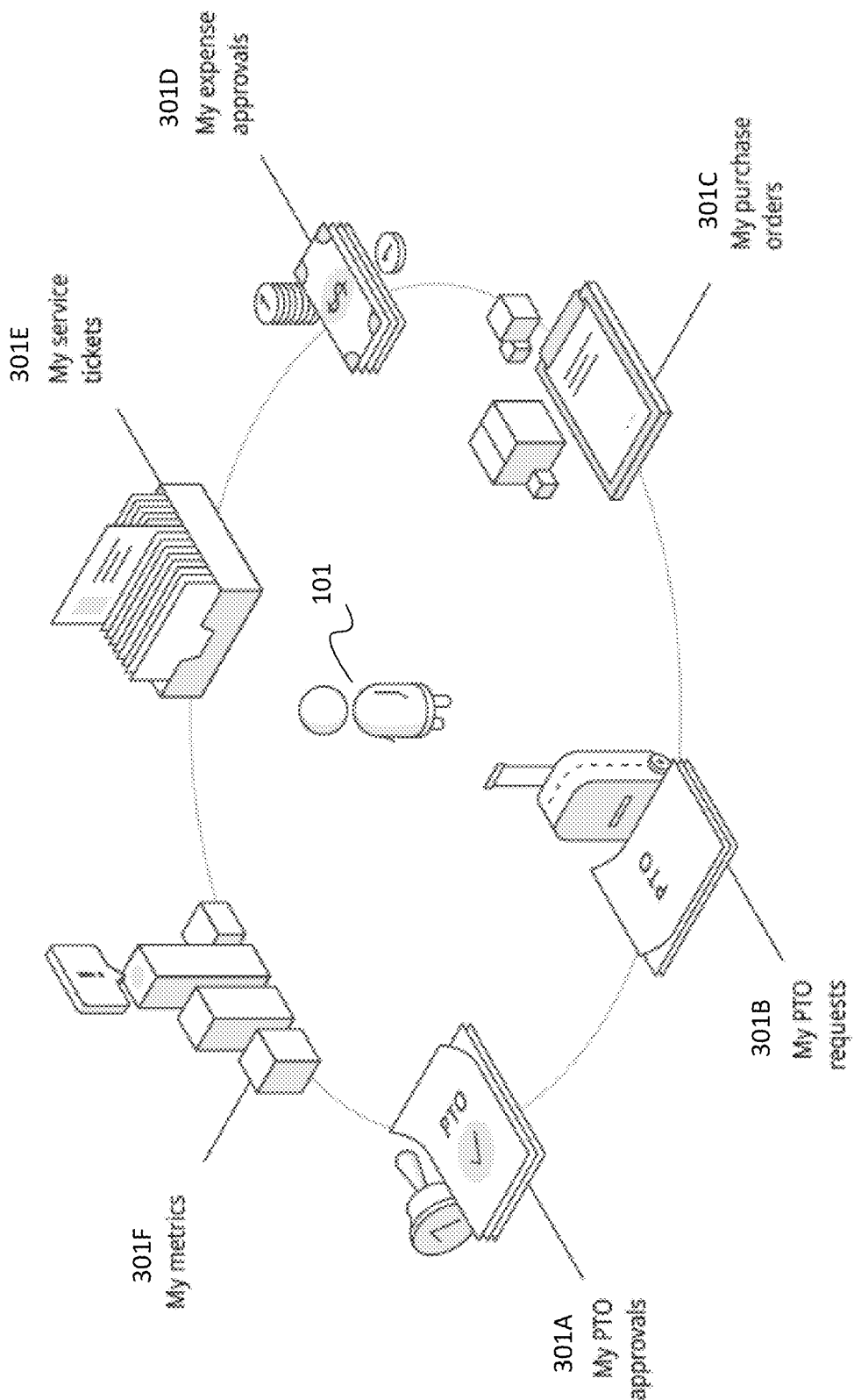
FIG. 3 is a diagram depicting a relationship between a user and data about the user that can be hosted in various enterprise systems.

Referring now to FIG. 3, there is shown a diagram depicting a relationship between user 101 and data 301 about the user that can be hosted in various enterprise systems. Such data can include, for example, PTO approvals 301A, PTO requests 301B, purchase orders 301C, expense approvals 301D, service tickets 301E, and metrics 301F.

Providing Access to Limited Data in a Federated Identity System

Figure 1:
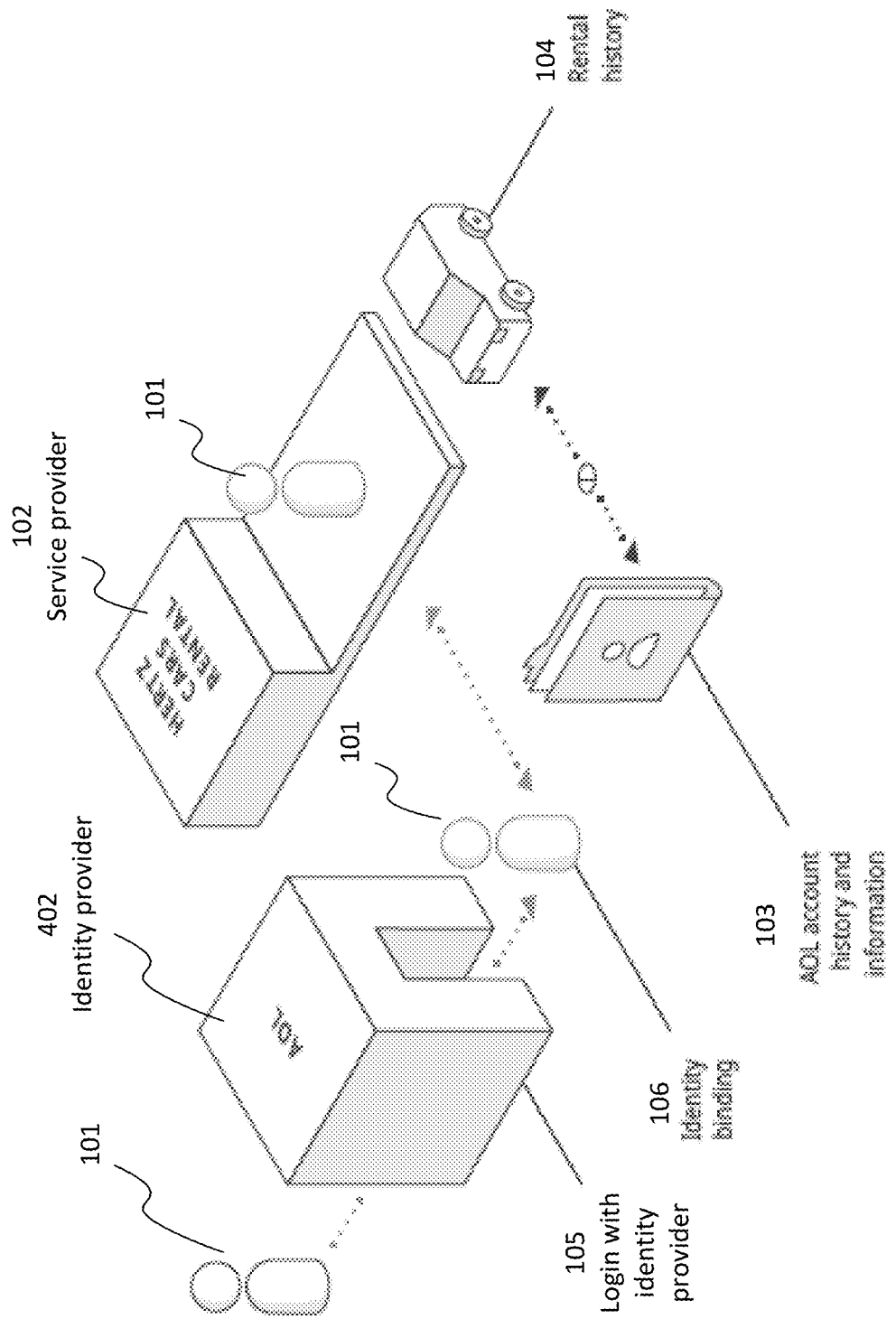
FIG. 1 is a block diagram depicting a conceptual model for identity management including federated identity, according to the prior art.
Figure 2:
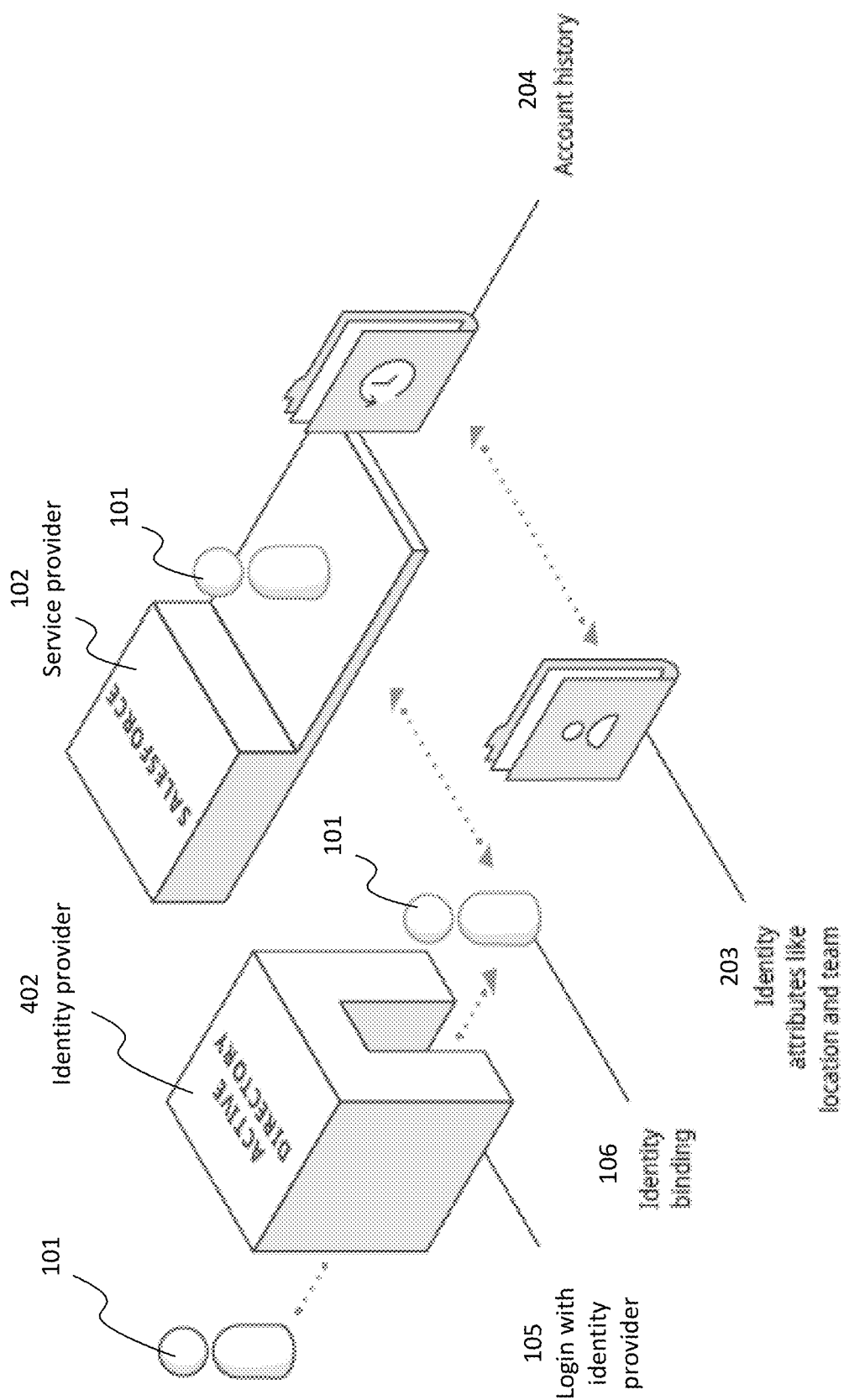
FIG. 2 is a block diagram depicting an architecture for storing limited data related to federated identity across numerous systems within an enterprise.

Referring now to FIG. 2, there is shown a block diagram depicting an architecture for providing access to limited data related to federated identity across numerous systems within an enterprise. In this architecture, user 101 logs in 105 with identity provider 402. Here, identity provider 402 may be implemented within an enterprise, for example, using a directory service such as Active Directory, available from Microsoft Corporation of Redmond, Wash. As in the example of FIG. 1, an identity binding 106 defines a relationship between an identity for user 101 at identity provider 402 and an account at service provider 102 (such as, for example, Salesforce.com, Inc. of San Francisco, Calif.). Here, however, because of the tight trust model within the enterprise, identity provider 402 and service provider 102 also share identity attributes 203 that may be stored at resources controlled by identity provider 402, such as location and team, as well as service provider data 204 (such as account history) that may be stored at resources controlled by service provider 102.

Architecture

Figure 14:
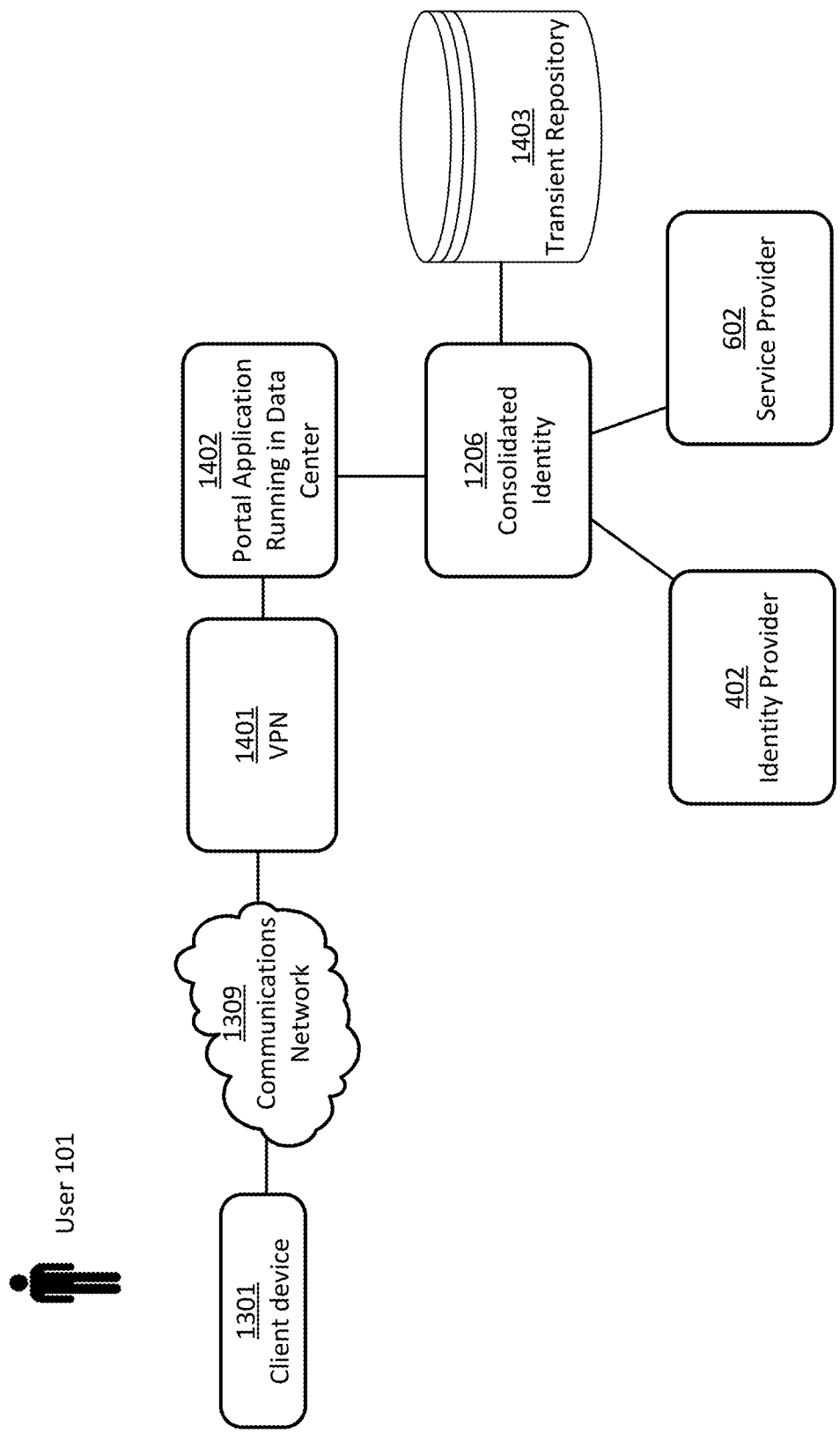
FIG. 14 is a block diagram depicting an overall physical architecture for a consolidated identity system, according to one embodiment.

Referring now to FIG. 14, there is shown a diagram depicting an overall physical architecture for a consolidated identity system, according to one embodiment.

Client device 1301 is any electronic device that operates under the control of user 101 and can be used for requesting and receiving information from server-based components via communications network 1309. Communications network 1309 can be any suitable electronic network for transmission of electronic data; examples include the Internet, an Intranet, a wireless network, or the like. In at least one embodiment, client device 1301 accesses portal application 1402 running in a data center to request and receive data. In at least one embodiment, Virtual Private Network (VPN) 1401 can be used for improving the security of such access, as is known in the art.

Consolidated identity module 1206 performs various functions described herein, including authenticating user 101 based on identity information obtained from identity provider 402, which may be, for example an Active Directory. Once user 101 has been authenticated, consolidated identity module 1206 makes data requests on behalf of user 101 from service provider 602, using enterprise software available, for example, from SAP SE of Walldorf, Germany. In at least one embodiment, consolidated identity module 1206 caches currently relevant, active data in transient repository 1403; any changes can later be transferred to service provider 602 as described in more detail below.

Figure 12:
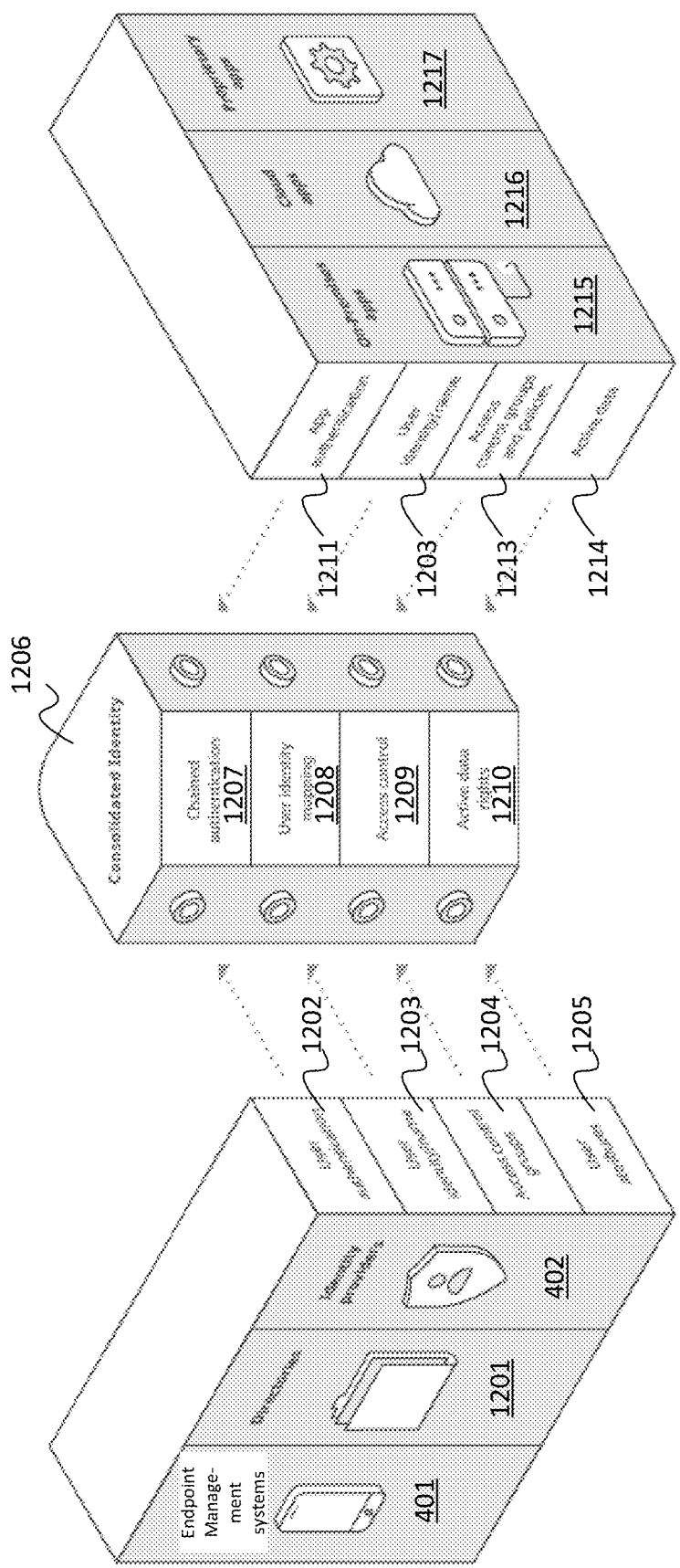
FIG. 12 is a diagram depicting an overall conceptual architecture for a consolidated identity system, according to one embodiment.

Referring now to FIG. 12, there is shown a diagram depicting an overall conceptual architecture for a consolidated identity system, according to one embodiment. In at least one embodiment, consolidated identity system 1206 as described herein includes functionality for providing chained authentication 1207, user identity mapping 1208, access control 1209, and active data rights 1210 for an enterprise system.

In at least one embodiment, consolidated identity module 1206 interacts with various components of the enterprise. Endpoint management systems 401 (for example including enterprise mobility management (EMM) systems), directories 1201, and identity providers 402 provide functionality for user authentication 1202, user identity/name 1203, access control groups 1204, and/or user attributes 1205. One example of an endpoint management system 401 that can be used in connection with the described system is Citrix Endpoint Management, available from Citrix, Inc. of Fort Lauderdale, Fla. and Santa Clara, Calif. Consolidated identity module 1206 also interacts with various pieces of software functionality, such as on-premises apps 1215, cloud apps 1216, and/or proprietary apps 1217, each of which can provide app authentication 1211, user identity/name 12103, access control groups and policies 1213, and/or active data 1214.

Figure 13:
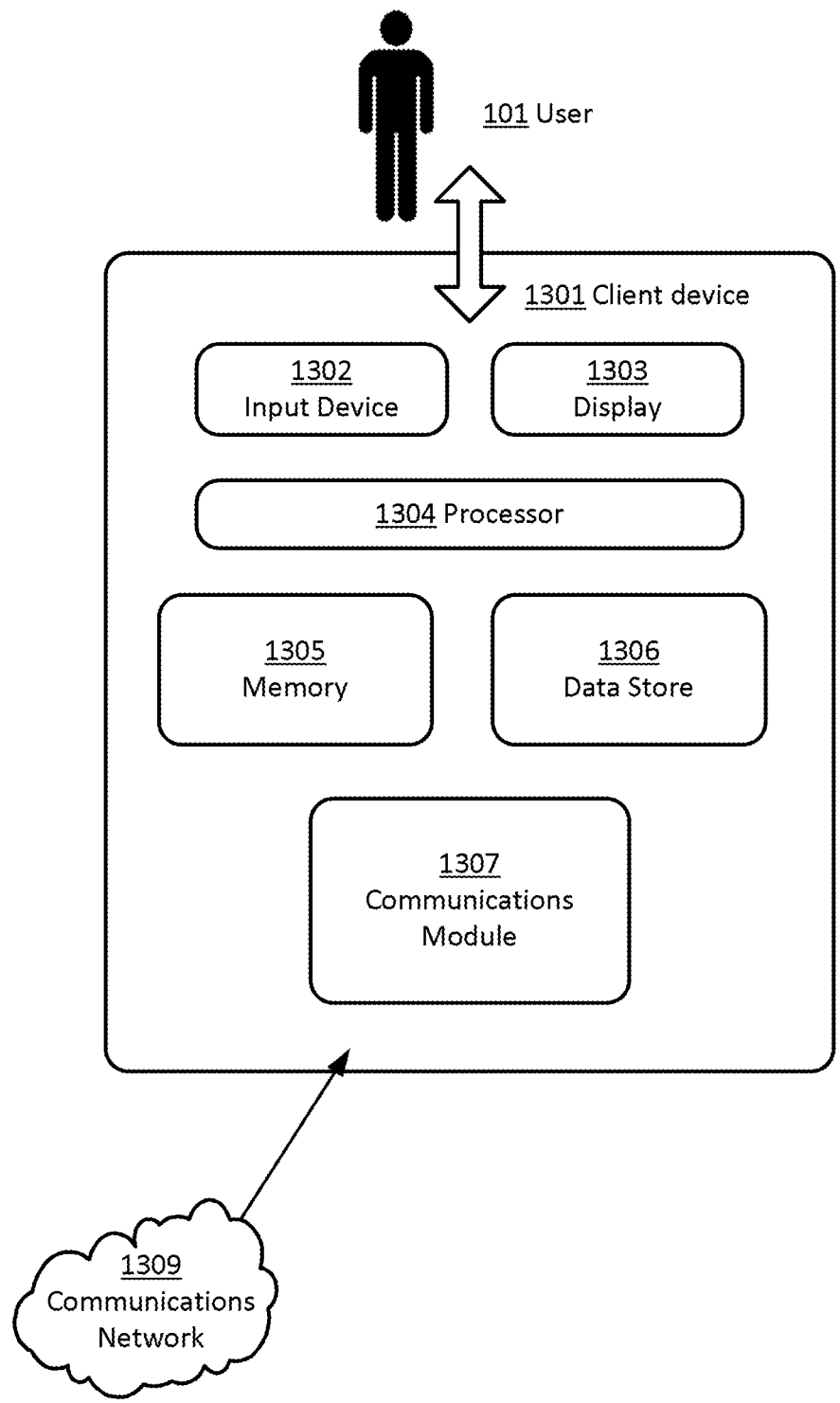
FIG. 13 is a block diagram depicting a hardware architecture for a client device that can be used in connection with the architecture depicted in FIGS. 12 and/or 14, according to one embodiment.

Referring now to FIG. 13, there is shown a block diagram depicting a hardware architecture for a client device 1301 that can be used in connection with the architecture depicted in FIGS. 12 and/or 14, according to one embodiment. Client device 1301 may be any electronic device equipped to receive, store, and/or present information, and to receive user input in connection with such information. Client device 1301 can be, for example, a desktop computer, laptop computer, personal digital assistant (PDA), cellular telephone, smartphone, music player, handheld computer, tablet computer, kiosk, game system, or the like.

In at least one embodiment, client device 1301 has a number of hardware components well known to those skilled in the art. Input device 1302 can be any element that receives input from user 101, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. Each user 101 can be, for example, an end user or a system administrator.

Data store 1306 can be any magnetic, optical, or electronic storage device for data in digital form; examples include flash memory, magnetic hard drive, CD-ROM, DVD-ROM, or the like.

Display 1303 can be any element that graphically displays information such as notifications, representations of data, user interface elements, prompts, and/or the like. Such output may include, for example, raw data, data visualizations, navigational elements, queries requesting confirmation and/or parameters for information identification, display, or presentation, and/or the like. In at least one embodiment where only some of the desired output is presented at a time, a dynamic control, such as a scrolling mechanism, may be available via input device 1302 to change which information is currently displayed, and/or to alter the manner in which the information is displayed.

In at least one embodiment, the information displayed on display 1303 may include data in text and/or graphical form, and can include various controls and elements for interacting with the displayed data, for example to dismiss alerts, follow links, forward alerts, investigate further, and/or perform other actions.

Processor 1304 can be a conventional microprocessor for performing operations on data under the direction of software, according to well-known techniques. Memory 1305 can be random-access memory, having a structure and architecture as are known in the art, for use by processor 1304 in the course of running software.

Data store 1306 can be local or remote with respect to the other components of client device 1301. Communications module 1307 provides functionality for communicating other components of the system, via a communications network 1309 such as the Internet, for example to issue requests for information, perform authentications, receive notifications, and/or perform other operations. Such communication between client device 1301 and other components can take place wirelessly, by Ethernet connection, via a computing network such as the Internet, via a cellular network, or by any other appropriate means.

In at least one embodiment, data store 1306 is detachable in the form of a CD-ROM, DVD, flash drive, USB hard drive, or the like. In another embodiment, data store 1306 is fixed within client device 1301.

In one embodiment, the system can be implemented as software written in any suitable computer programming language, whether in a standalone or client/server architecture. Alternatively, it may be implemented and/or embedded in hardware.

The system and method described herein can be implemented on architectures such as those depicted in FIGS. 12 and 13. However, one skilled in the art will recognize that other architectures can be used as well. Accordingly, the descriptions provided herein are intended to be illustrative and are not intended to limit scope to any particular implementation or architecture.

In at least one embodiment, a consolidated identity framework includes five elements:

(1) consolidated active data;
(2) authentication by one or more identity providers;
(3) authorization by an identity provider;
(4) authorization by a service provider; and
(5) writing back to service providers with either delegated or direct authorization.

One skilled in the art will recognize that these five elements can be implemented singly or in any combination. Each will be described in turn.

Consolidated Active Data

In at least one embodiment, transient repository 1403 contains currently relevant, active data, such as that associated with an employee from each service provider 602. Since access controls for employee data are typically also stored by each service provider 602, the controls are also synced to the transient database.

In general, it is not necessary to consolidate all data for an employee; rather, only active data need be consolidated. For example, the requests of the consolidated identity could be only for open time-off requests, rather than every time-off request ever made for both active and inactive employees. Thus, active data can be defined as that subset of all data that is of interest at any given time, such as for example open and recently changed records within a data set.

Sometimes it is not possible to consolidate certain data. Accordingly, in at least one embodiment, a fallback is provided by pulling the data on an ad hoc basis, using traditional API mechanisms. For example, if a user is attempting to retrieve information from a database containing a large number of records. Given the large number of records, it may not be feasible for all data in all the records to be synchronized and made available from different sources. Thus, in at least one embodiment, some information may be synchronized while other information may only be retrieved from the primary source upon demand.

In at least one embodiment, when employee data is consolidated, controls are added to maintain data security. Such controls can include, for example, authentication and/or authorization, as described in more detail below.

Authentication by One or More Identity Providers

One benefit of federated identity is the ability to use an identity provider such as Active Directory Federation Services to enable single sign-on (SSO) across multiple service providers such as Salesforce and SAP. However, it is not uncommon to have multiple identity providers that provide authentication, whether due to mergers or for compliance reasons. In at least one embodiment, the consolidated identity framework described herein embraces authentication via multiple identity providers and also binds a user's account names across multiple identity providers.

Another common enterprise scenario is chaining identity providers, such as when a user authenticates an endpoint management system, such as Citrix Endpoint Management. For example, when a user 101 uses fingerprint authentication, his or her identity is mapped to the user's account in an identity provider such as Active Directory, in order to validate authorization.

Figure 4:
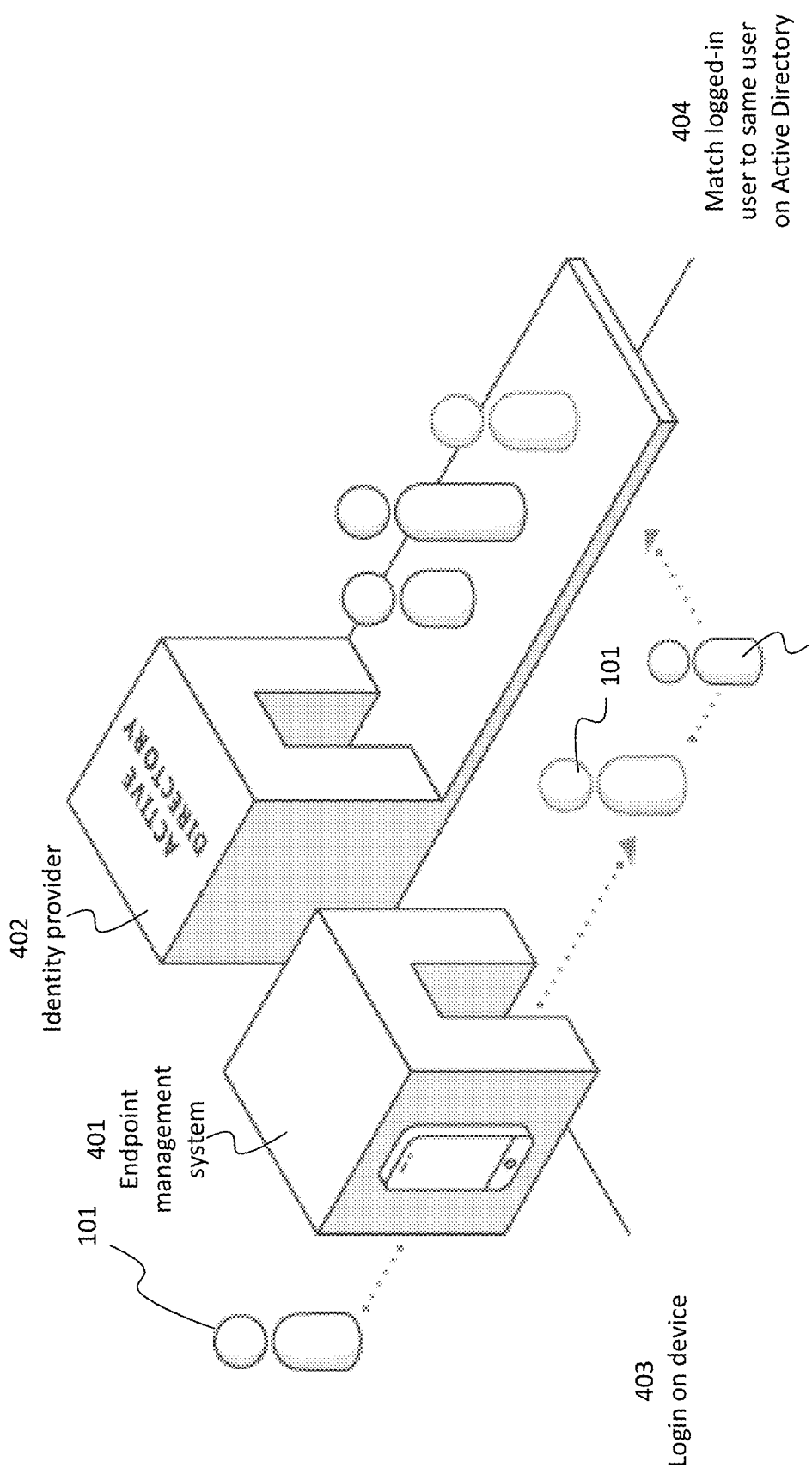
FIG. 4 is a diagram depicting an example of a method of mapping a user's identity to validate authorization, according to one embodiment.

Referring now to FIG. 4, there is shown a diagram depicting an example of a method of mapping a user's 101 identity to bind authorizations, according to one embodiment. User 101 logs in 403 via endpoint management system 401. Based on the log-in information, user 101 is matched 404 to user's account on identity provider 402 (which may, for example be an Active Directory), so as to determine which resources the user 101 is authorized to access. In at least one embodiment, the system does not validate authorizations. Rather, the system relies on the local device to authenticate user 101, for example via a fingerprint or password, and then retrieve information that user 101 is permitted to access.

Authorization by an Identity Provider

In at least one embodiment, an identity provider can provide appropriate authorization in connection with a user 101. Typically, identity providers provide coarse-grained authorization via groups and attributes. For example, authorization might be provided for a group such as "East Coast Sales". In a consolidated identity framework as described herein, such authorization can be asserted so as to enable access to services.

Figure 5:
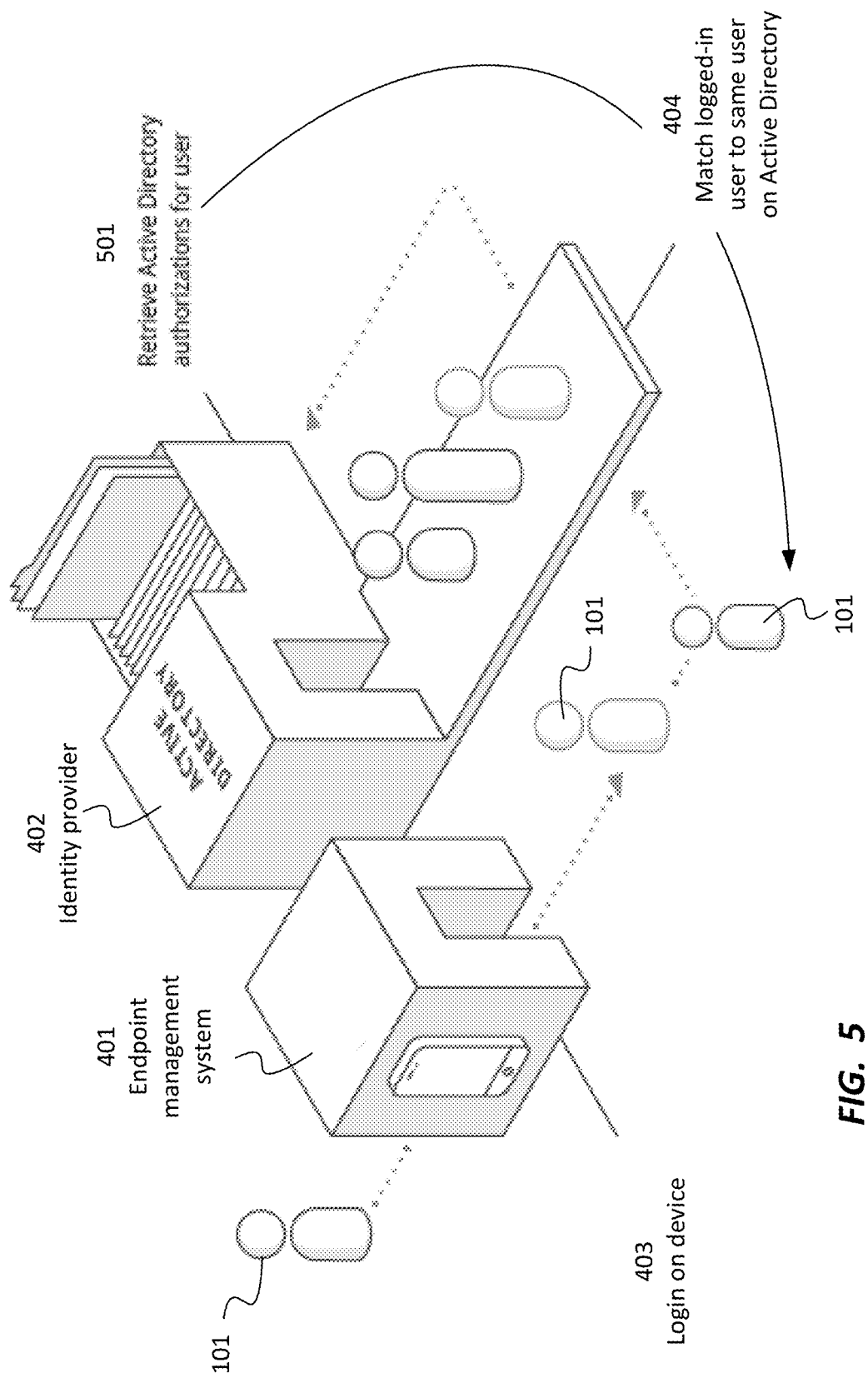
FIG. 5 is a diagram depicting a method of chained authentication to enable access to services, according to one embodiment.

Referring now to FIG. 5, there is shown an example of a method of chained authentication to enable access to services, according to one embodiment. As in the method of FIG. 4, user 101 logs in 403 via endpoint management system 401. Based on the log-in information, user 101 is matched 404 to user's account on identity provider 402. Identity provider 402 authorizations for user 101 are then retrieved 501 so as to determine which resources user 101 is authorized to access.

In this manner, the system is able to determine what authorizations are available to user 101 even if the authenticating device itself does not know this information. The chained authentication mention of FIG. 5 allows for two or more authentication providers to be provided, thus providing improved functionality over conventional systems that provide authorization but not authentication. More specifically, according to the described method, once user 101 has logged in, the system matches user 101 to a record in identity provider 402 to determine what resources user 101 is allowed to access, thus providing a technique of chained authentication. In at least one embodiment, the described method is able to determine authorization via groups and attributes to enable access to services.

Authorization by a Service Provider

In some cases, it may be desirable for service providers to include fine-grained security controls on data and records. For example, human resources systems often attempt to ensure that human resources staff can only see data associated with their employee populations.

The following are three examples of ways that a consolidated identity framework can integrate service provider authorization.

1) Import Entitlements that are Embedded into Data Records

Figure 6:
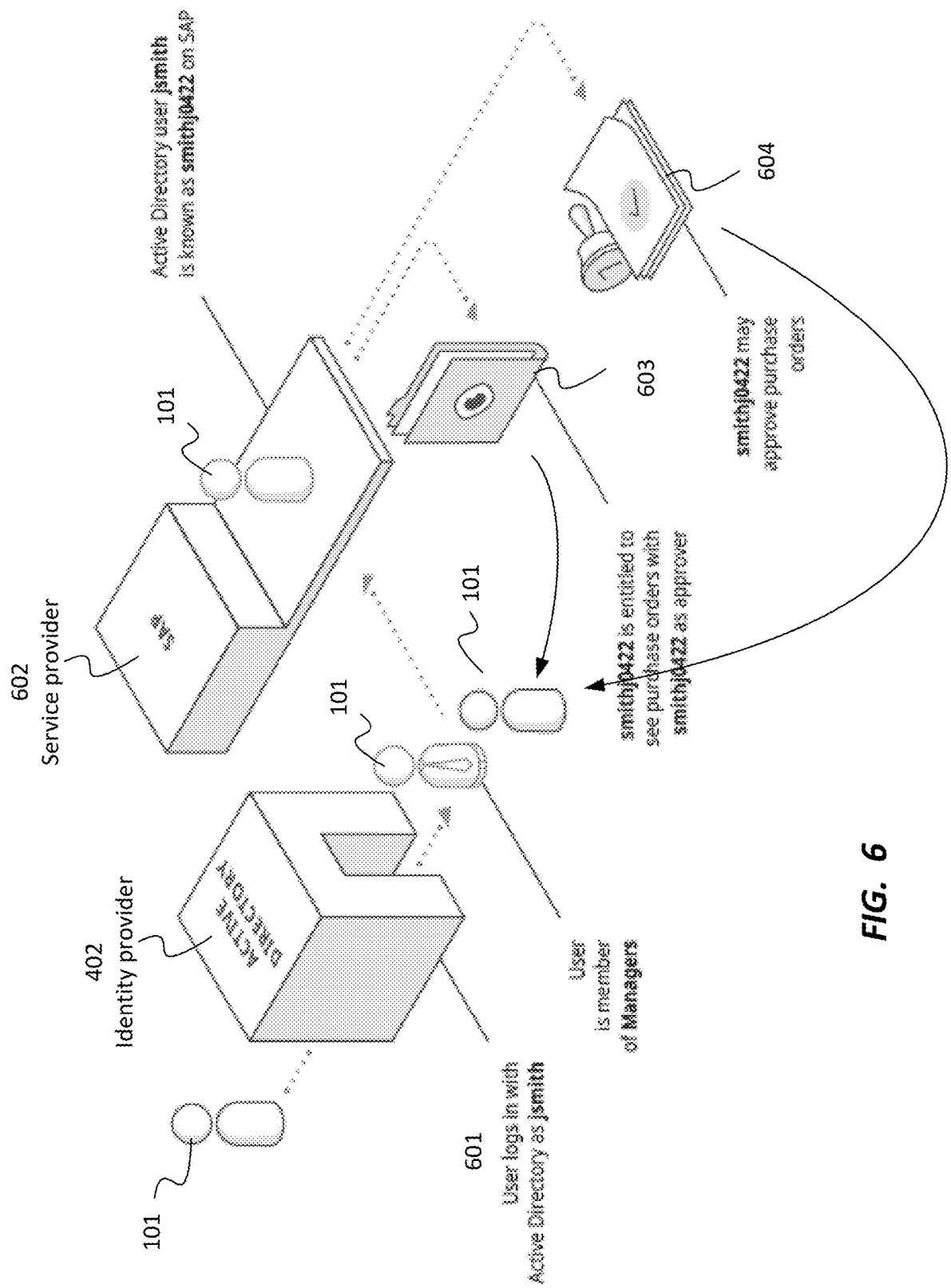
FIG. 6 is a diagram depicting an example of a method of mapping the identity of a user from an identity provider through to a service provider, importing entitlements, and filtering access based on the user's identity, according to one embodiment.

Referring now to FIG. 6, there is shown a diagram depicting an example of a method of mapping the identity of a user 101 from an identity provider 402 (such as Active Directory 402) through to a service provider 602, importing entitlements, and filtering access based on user's 101 identity, according to one embodiment. In this manner, user 101 can be known system-wide via dynamic account mapping after logging in at a single location.

Many service providers (such as SAP) include entitlements directly in records, specifying who is authorized to do what to each record (such as, for example, approve a purchase order). In at least one embodiment, the consolidated identity framework maps the identity of user 101 from identity provider 601 through to service provider 602.

For example, as shown in FIG. 6, user 101 logs in 601 as "jsmith" with identity provider 402, and is determined to be a member of a group called Managers. On service provider 602 (which in this example is SAP), user 101 is known as "smithj0422" and is entitled to see records (such as purchase orders 603) that have smithj0422 as approver. Also, service provider 602 specifies that user 101 is able to approve purchase orders 604. Since these entitlements in the active purchase order can be copied into transient repository 1403, the consolidated identity framework imports the entitlements that originated from service provider 602, and can filter access appropriately based on user's 101 identity.

2) Synchronize Authorization Groups and Defined Record Filters

For service providers that use medium-grained filtering such as established groups and defined record filters, such security authorizations can be copied into the consolidated identity framework and directly applied to transient data. For example, a manager only needs access to open time-off requests, and should only be able to see time-off requests for their employees. An employee should only be able to see their time off requests.

Figure 7:
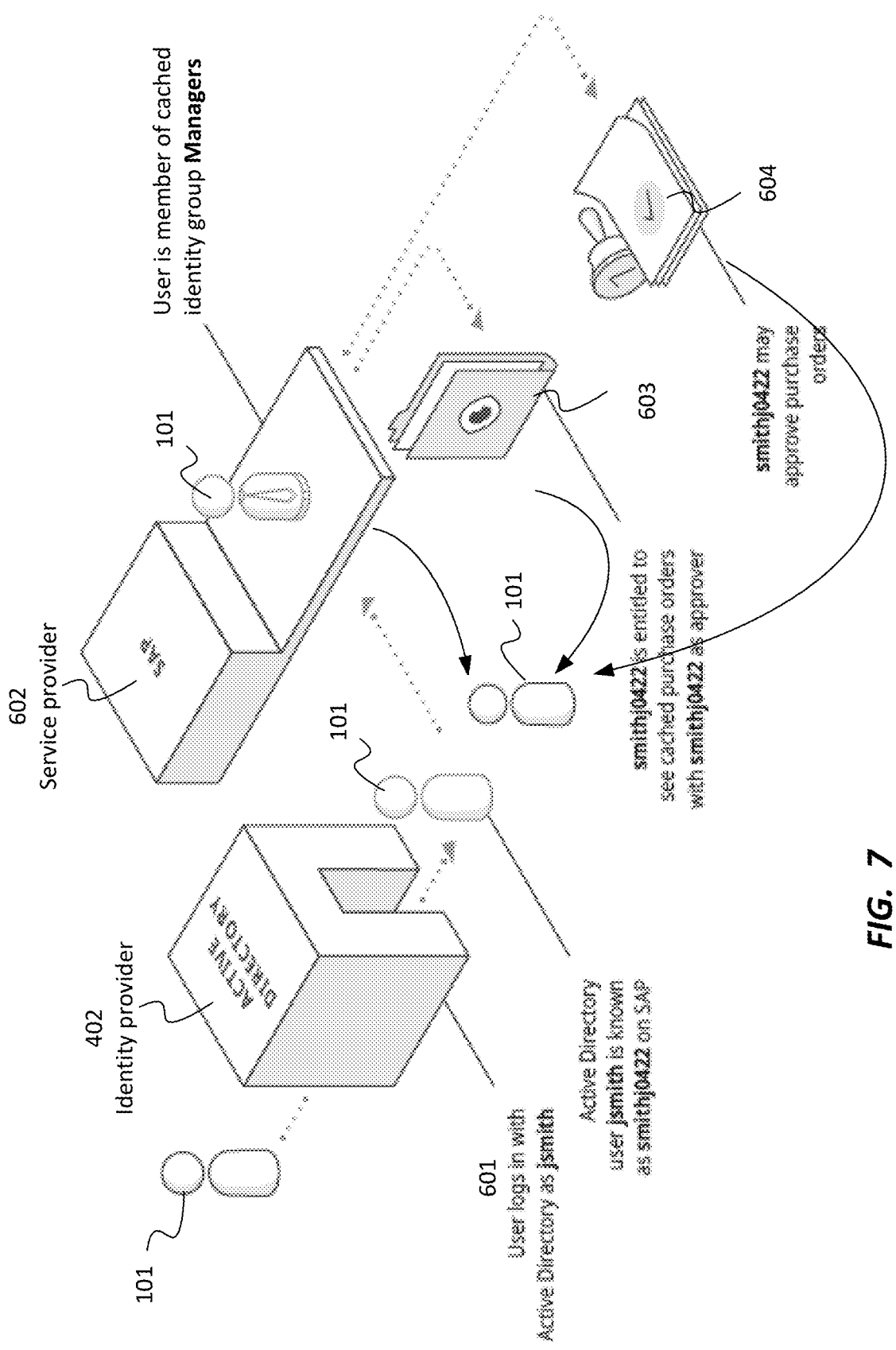
FIG. 7 is a diagram depicting an example of a method for copying security authorizations from a service provider in a consolidated identity framework, according to one embodiment.

Referring now to FIG. 7, there is shown a diagram depicting an example for using the described techniques in connection with a service provider 602, by copying security authorizations (such as security groups) in a consolidated identity framework, and applying such authorizations to cached data from that service provider 602, according to one embodiment. In this example, user 101 logs in 601 as "jsmith" with identity provider 402. On service provider 602 (which in this example is SAP), user 101 is known as "smithj0422" and is determined to be a member of a cached identity group called "Managers" which is defined at service provider 602. Security authorizations are copied from service provider 602 and placed into the consolidated ID framework. Such security authorizations can be associated with individual users and/or groups.

Accordingly, user 101 is entitled to see cached purchase orders 603 that have smithj0422 as approver. Also, service provider 602 specifies that user 101 is able to approve purchase orders 604.

This approach can also be combined across systems. For example, relevant employee HR data can be copied into the transient data store from a human resource system, along with group and record filter specifications. The HR data can then be combined with HR data from other systems, each with its own group and record filter specifications. When an HR staff member queries the transient data store to pull up a consolidated view of an employee, he or she can only see the specific data they are allowed to see as provisioned in each source system.

3) Inquire with the Service Provider Ad-Hoc to Learn What a User can do

Some service providers 602 use very dynamic, logic-based security authorization. In this case, the consolidated identity system calls service provider 602 to ask for permission information. However, the consolidated identity system need not query the actual data from multiple systems, only the permissions to see the data.

Figure 8:
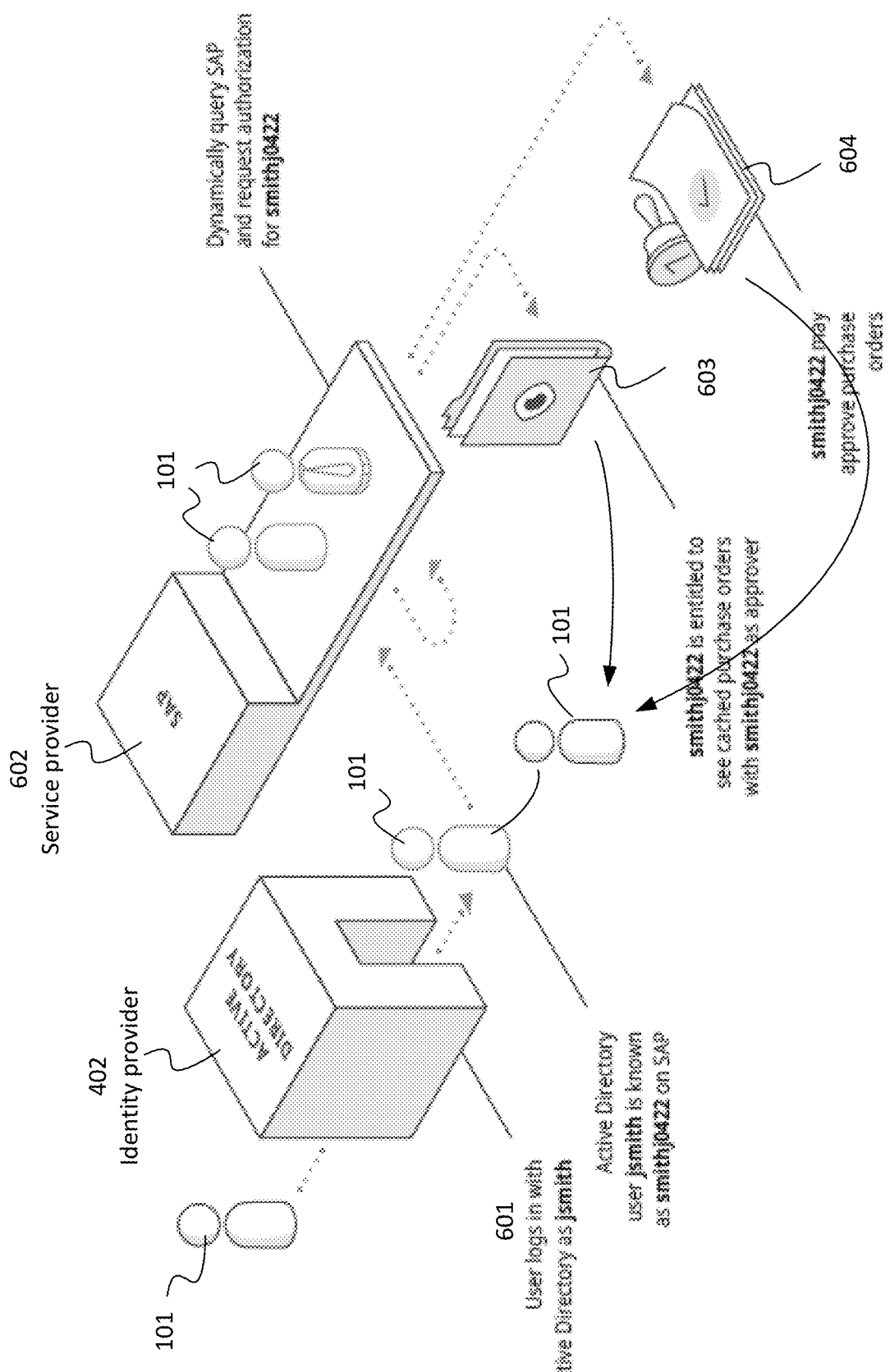
FIG. 8 is a diagram depicting an example of a method for using the described techniques in connection with a service provider that uses dynamic, logic-based security authorization, by calling the service provider to request permission information, according to one embodiment.

Referring now to FIG. 8, there is shown a diagram depicting an example of such a method. The method of FIG. 8 is similar to that of FIG. 7. However, here, once it is determined that user 101 is known as "smithj0422" on service provider 602, the system calls service provider 602 to request permission information. Once the permission information is provided, the entitlements and limitations specified by service provider 602 can be applied, such as the ability for user 101 to see cached purchase orders 603 on which he is the approver, and to approve purchase orders 604.

The technique depicted in FIG. 8 thus allows for more complicated and/or specific authorizations. For example, user 101 may be authorized to see records related to specific territories and/or dollar amounts; such specific authorizations can be enabled using the dynamic methodology depicted in FIG. 8.

Writing Back to Service Providers

In at least one embodiment, since a consolidated identity module 1206 uses transient repository 1403; any data changes are made directly back to service provider 102.

One critical aspect of a writeback is to validate the coherency of the transient repository. For example, before a purchase order can be approved for a particular amount, the system must first verify that the purchase order is still for the correct amount, and has not been changed to another amount in the source system.

Depending on the service provider API capabilities and compliance with enterprise policies, any of various mechanisms can be used to perform the writeback to service provider 102. Three examples of such mechanisms are described below.

1) API with Delegated Authentication Using a Service Account

Figure 9:
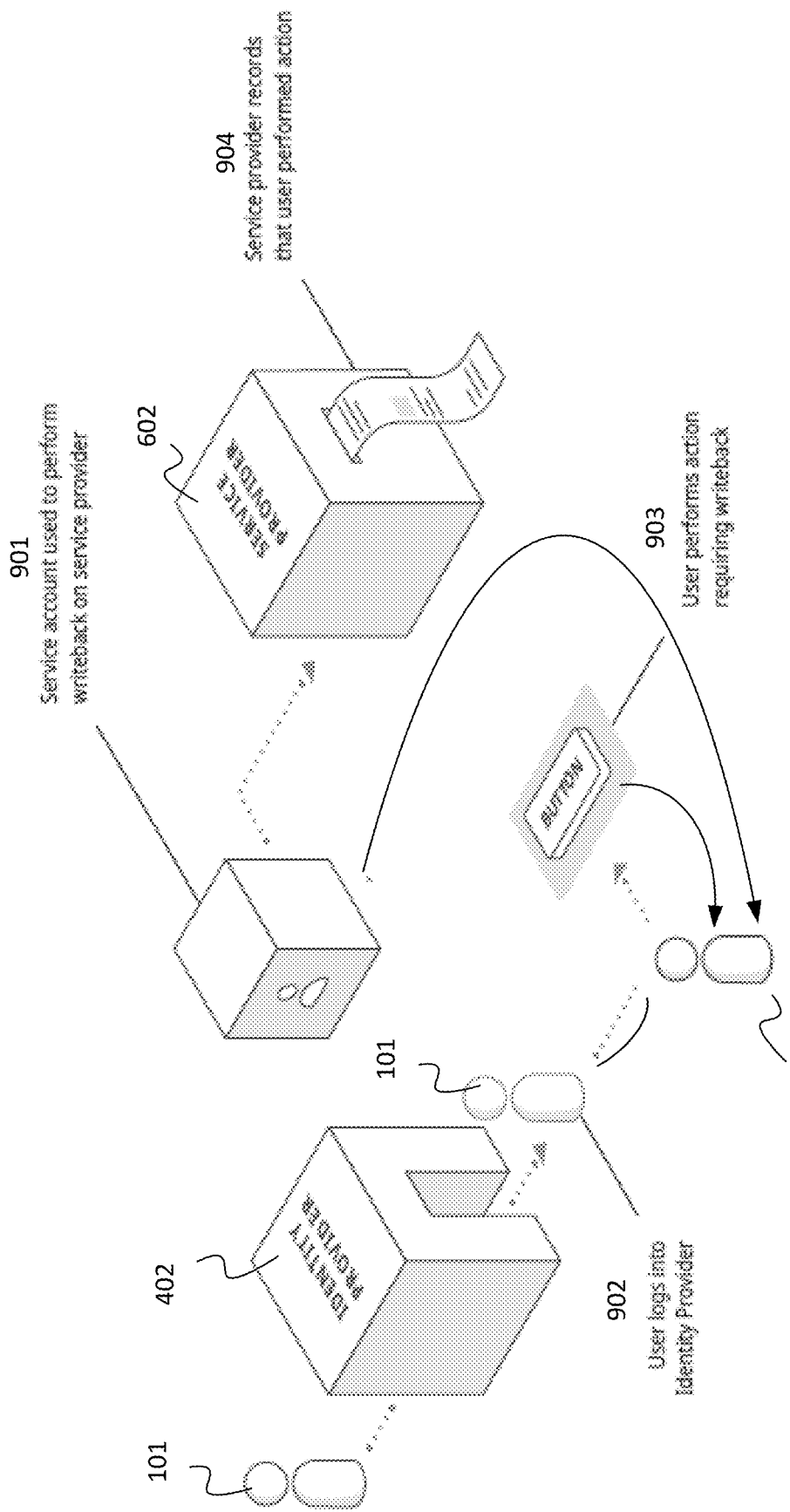
FIG. 9 is a diagram depicting an example of a method for using delegated authentication when writing back to a service provider using an API, according to one embodiment.

In at least one embodiment, a consolidated identity framework can employ delegated authentication when writing back to service provider 102 using an API. Referring now to FIG. 9, there is shown a diagram depicting an example of such a process. User 101 logs into 902 identity provider 402. When user 101 performs 903 an action requiring a writeback to service provider 602, the consolidated identity framework uses an API to service provider 602, authenticated by a service account 901 on behalf of user 101. The user's account at service provider 602 is then used 1005 to perform the writeback at service provider 602.

In various embodiments, service provider 602 records 904 the fact that user 101 performed the action that required writeback, either by recording user 101 as the initiator of the writeback, or by appending a note to the record indicating that service account 901 performed the writeback on behalf of user 101. Service provider 602 is the authenticator of the writeback, but the writeback done on behalf of user 101.

2) API with User-Based Authentication Using an SSO

Figure 10:
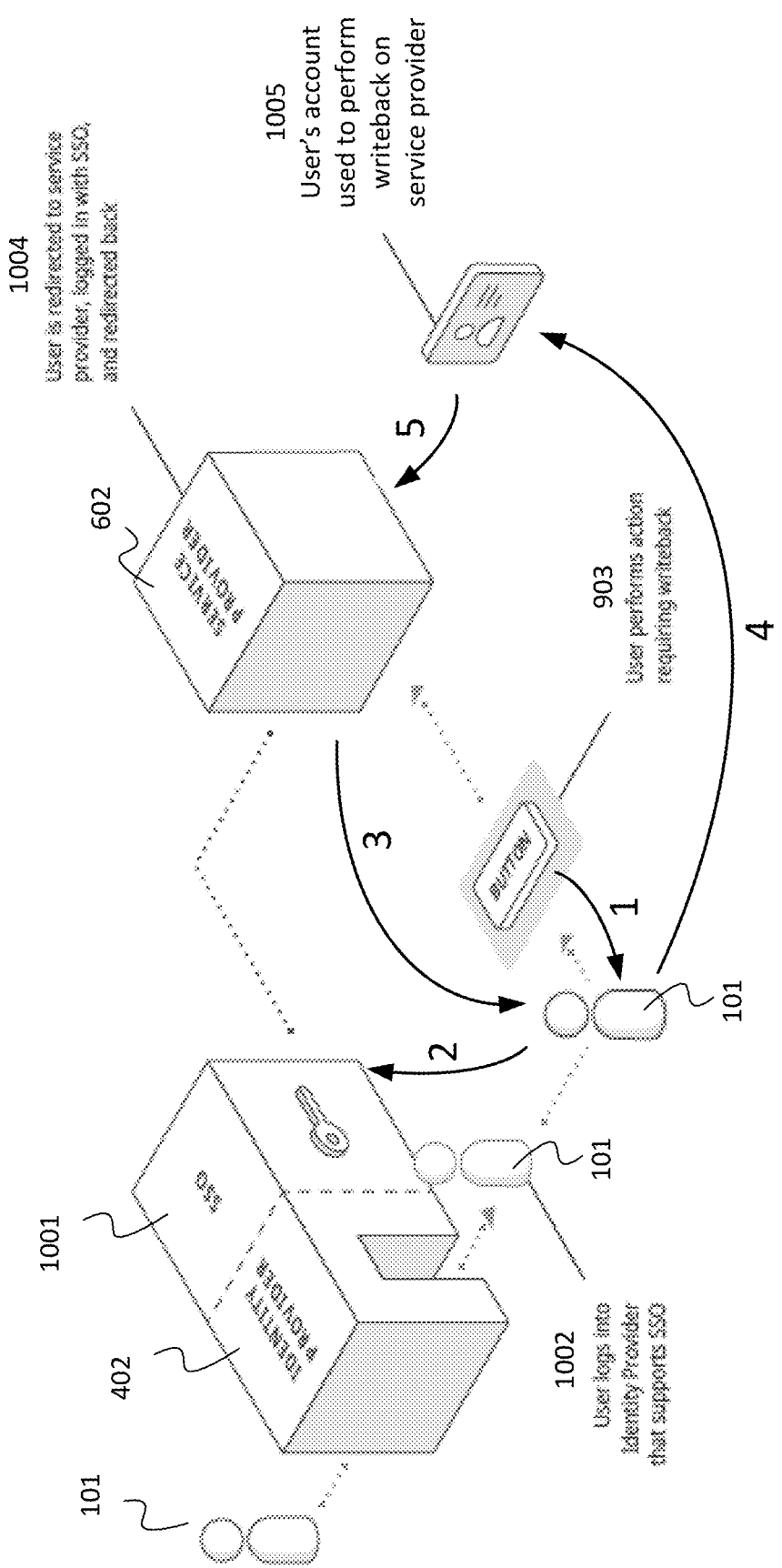
FIG. 10 is a diagram depicting an example of a method for using single sign-on to automatically log in a user so as to enable writeback in a system that does not support delegated authentication, according to one embodiment.

Some APIs, such as SAP BAPI, do not support delegated authentication and will only perform a writeback if user 101 has logged in him- or herself. In at least one embodiment, a consolidated identity framework can employ delegated authentication when writing back to service provider 102 using an API. Referring now to FIG. 10, there is shown a diagram depicting an example of a method for using single sign-on to automatically log in user 101 so as to enable writeback in a system that does not support delegated authentication, according to one embodiment.

User 101 logs into 1002 the consolidated identity framework via identity provider 402, which supports single sign-on capability 1001 for service provider 602. When user 101 performs 903 an action requiring a writeback to service provider 602 (step 1), several steps take place. First, user 101 is redirected to the login page of service provider 602, SSO 1001 automatically logs in 1004 user 101 (step 2), and user 101 is then redirected back to the consolidated identity system (step 3). The consolidated identity system now has the credentials necessarily to perform 1005 the writeback with user's 101 credentials (steps 4 and 5).

3) Pass-Through to the Service Provider Using a Deep Link

As a third approach, for systems that either do not support API access or for compliance reasons do not permit API access, user 101 can be deep-linked directly to the relevant page of the service provider application to directly perform a writeback action by clicking a button or other workflow.

Figure 11:
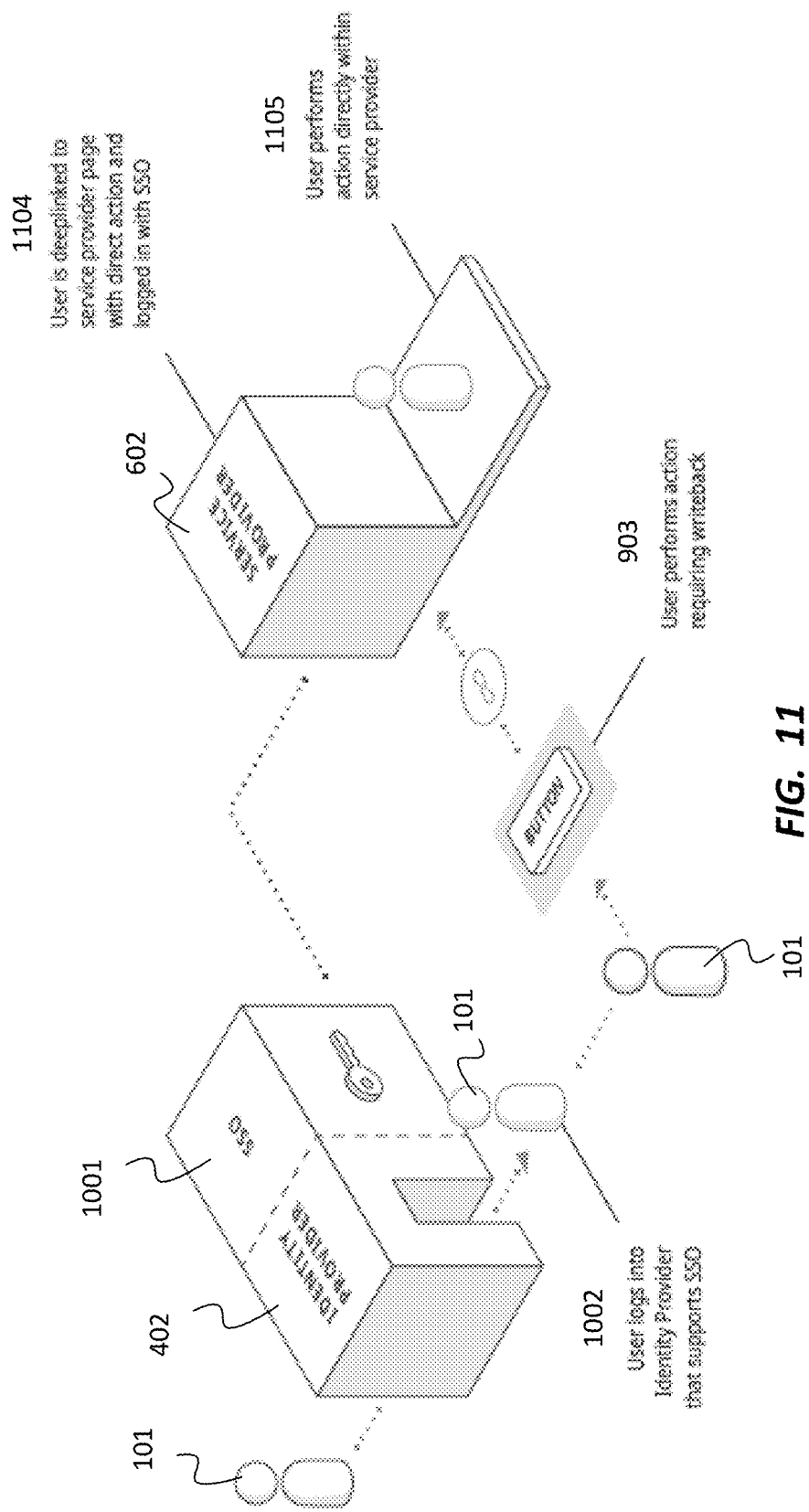
FIG. 11 is a diagram depicting an example of a method for using deep-linking to a relevant page to perform a writeback action directly, according to one embodiment.

Referring now to FIG. 11, there is shown an example of such a process. User 101 logs into 1002 the consolidated identity framework via identity provider 402, which supports single sign-on capability 1001 for service provider 602. When user 101 performs 903 an action requiring a writeback to service provider 602, user 101 is deep-linked 1104 to a service provider page and logged in with SSO. User 101 can then manually perform 1105 the writeback action directly within service provider 602. Alternatively, writeback actions can take place automatically.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for consolidating identity information across an enterprise comprising a plurality of enterprise systems, comprising:
    storing in a repository a subset of data associated with a user obtained from one or more service providers providing one or more enterprise systems, the subset of data comprising a plurality of entitlements specifying who is authorized to do what to each record in the subset of data from each of the one or more enterprise systems;
    authenticating the user at an identity provider;
    receiving a request from the user to access a resource associated with one of the enterprise systems;
    determining, based on at least one of the plurality of entitlements in the repository, whether the user is authorized to access the requested resource;
    responsive to the determination indicating that the user is authorized to access the requested resource, providing access to the requested resource;
    responsive to detecting an action causing a writeback to a service provider of the one or more services providers, authenticating an identified account of the user at the service provider; and
    causing the writeback to be performed at the service provider using the identified account of the user.

2. The method of claim 1, wherein:
    each entitlement is associated with a group of users; and
    determining whether the user is authorized to access the requested re-source comprises determining whether the user belongs to a group that is indicated, in the at least one copy of at least one entitlement, to be authorized to access the requested resource.

3. The method of claim 1, wherein determining whether the user is authorized to access the requested resource comprises:
    matching the user to an account on the identity provider;
    retrieving at least one identity provider authorization for the user; and
    determining, based on the retrieved at least one identity provider authorization, whether the user is authorized to access the requested resource.

4. The method of claim 1, wherein determining whether the user is authorized to access the requested resource comprises:
    mapping the user identity on the identity provider to a second user identity on a service provider;
    determining at least one entitlement for the user at a service provider; and
    importing the at least one entitlement from the service provider so as to authorize access to the requested resource.

5. The method of claim 4, wherein importing the at least one entitlement from the service provider comprises copying the at least one entitlement into the repository.

6. The method of claim 1, wherein determining whether the user is authorized to access the requested resource comprises:
    mapping the user identity on the identity provider to a second user identity on a service provider;
    at the service provider, determining that the user is a member of a cached service provider group;
    at the service provider, based on the membership of the user in the cached service provider group, determining at least one entitlement for the user; and
    importing the at least one entitlement from the service provider so as to authorize access to the requested resource.

7. The method of claim 6, wherein importing the at least one entitlement from the service provider comprises copying the at least one entitlement into the repository.

8. The method of claim 6, wherein determining at least one entitlement for the user comprises issuing a call to service provider to request permission information, and receiving the requested permission information.

9. The method of claim 1, further comprising:
    detecting the action requiring a writeback to the service provider;
    identifying the account of the user at the service provider;
    authenticating the user in connection with the identified account of the user; and
    performing the writeback using the identified account of the user.

10. The method of claim 9, wherein authenticating the user in connection with the identified account comprises authenticating the user based on single-sign-on at the identity provider.

11. The method of claim 9, wherein performing the writeback using the identified account comprises:
    presenting the user with a link to a service provider page; and
    receiving user input via the service provider page to perform the writeback.

12. A non-transitory computer-readable medium for consolidating identity information across an enterprise comprising a plurality of enterprise systems, comprising instructions stored thereon, that when executed by at least one processor, perform the steps of:
    storing in a repository a subset of data associated with a user obtained from one or more service providers providing one or more enterprise systems, the subset of data comprising a plurality of entitlements specifying who is authorized to do what to each record in the subset of data from each of the one or more enterprise systems;

authenticating the user at an identity provider;
receiving a request from the user to access a resource associated with one of the enterprise systems;
determining, based on at least one of the plurality of entitlements in the repository, whether the user is authorized to access the requested resource;
responsive to the determination indicating that the user is authorized to access the requested resource, providing access to the requested resource;
responsive to detecting an action causing a writeback to a service provider of the one or more services providers, authenticating an identified account of the user at the service provider; and
causing the writeback to be performed at the service provider using the identified account of the user.

13. The non-transitory computer-readable medium of claim 12, wherein:
each entitlement is associated with a group of users; and
determining whether the user is authorized to access the requested resource comprises determining whether the user belongs to a group that is indicated, in the at least one copy of at least one entitlement, to be authorized to access the requested resource.

14. The non-transitory computer-readable medium of claim 12, wherein determining whether the user is authorized to access the requested resource comprises:
matching the user to an account on the identity provider;
retrieving at least one identity provider authorization for the user; and
determining, based on the retrieved at least one identity provider authorization, whether the user is authorized to access the requested resource.

15. The non-transitory computer-readable medium of claim 12, wherein determining whether the user is authorized to access the requested resource comprises:
mapping the user identity on the identity provider to a second user identity on a service provider;
determining at least one entitlement for the user at a service provider; and
copying the at least one entitlement from the service provider to the repository, so as to authorize access to the requested resource.

16. The non-transitory computer-readable medium of claim 12, wherein determining whether the user is authorized to access the requested resource comprises:
mapping the user identity on the identity provider to a second user identity on a service provider;
at the service provider, determining that the user is a member of a cached service provider group;
at the service provider, based on the membership of the user in the cached service provider group, determining at least one entitlement for the user; and
copying the at least one entitlement from the service provider to the repository, so as to authorize access to the requested resource.

17. The non-transitory computer-readable medium of claim 16, wherein determining at least one entitlement for the user comprises issuing a call to service provider to request permission information, and receiving the requested permission information.

18. The non-transitory computer-readable medium of claim 12, further comprising instructions stored thereon, that when executed by at least one processor, perform the steps of:
detecting the action requiring a writeback to the service provider;
identifying the account of the user at the service provider;
authenticating the user in connection with the identified account of the user; and
performing the writeback using the identified account of the user.

19. The non-transitory computer-readable medium of claim 18, wherein authenticating the user in connection with the identified account comprises authenticating the user based on single-sign-on at the identity provider.

20. The non-transitory computer-readable medium of claim 18, wherein performing the writeback using the identified account comprises:
presenting the user with a link to a service provider page; and
receiving user input via the service provider page to perform the writeback.

21. A system for consolidating identity information across an enterprise comprising a plurality of enterprise systems, comprising:
a repository storing a subset of data associated with a user obtained from one or more service providers providing one or more enterprise systems, the subset of data comprising a plurality of entitlements specifying who is authorized to do what to each record in the subset of data from each of the one or more enterprise systems
one or more processors, coupled to memory, and configured to:
authenticate the user at an identity provider; and
receive a request from the user to access a resource associated with one of the enterprise systems;
determine, based on at least one of the plurality of entitlements in the repository, whether the user is authorized to access the requested resource;
responsive to the determination indicating that the user is authorized to access the requested resource, provide access to the requested resource;
responsive to detecting an action causing a writeback to a service provider of the one or more services providers, authenticating an identified account of the user at the service provider; and
causing the writeback to be performed at the service provider using the identified account of the user.

22. The system of claim 21, wherein:
each entitlement is associated with a group of users; and
determining whether the user is authorized to access the requested resource comprises determining whether the user belongs to a group that is indicated, in the at least one copy of at least one entitlement, to be authorized to access the requested resource.

23. The system of claim 21, wherein determining whether the user is authorized to access the requested resource comprises:
matching the user to an account on the identity provider;
retrieving at least one identity provider authorization for the user; and
determining, based on the retrieved at least one identity provider authorization, whether the user is authorized to access the requested resource.

24. The system of claim 21, further comprising the repository, wherein determining whether the user is authorized to access the requested re-source comprises:
mapping the user identity on the identity provider to a second user identity on a service provider;
determining at least one entitlement for the user at a service provider; and
copying the at least one entitlement from the service provider to the repository, so as to authorize access to the requested resource.

25. The system of claim 21, further comprising the repository, wherein determining whether the user is authorized to access the requested re-source comprises:

mapping the user identity on the identity provider to a second user identity on a service provider;

at the service provider, determining that the user is a member of a cached service provider group;

at the service provider, based on the membership of the user in the cached service provider group, determining at least one entitlement for the user; and copying the at least one entitlement from the service provider to the repository, so as to authorize access to the requested resource.

26. The system of claim 25, wherein determining at least one entitlement for the user comprises issuing a call to service provider to request permission information, and receiving the requested permission information.

27. The system of claim 21, further comprising:

detecting the action requiring a writeback to the service provider;

identifying the account of the user at the service provider;

authenticating the user in connection with the identified account of the user; and performing the writeback using the identified account of the user.

28. The system of claim 27, wherein authenticating the user in connection with the identified account comprises authenticating the user based on single-sign-on at the identity provider.

29. The system of claim 27, wherein performing the writeback using the identified account comprises:

presenting the user with a link to a service provider page; and receiving user input via the service provider page to perform the writeback.

\* \* \* \* \*